(12) United States Patent
Doring et al.

(10) Patent No.: US 8,418,679 B2
(45) Date of Patent: Apr. 16, 2013

(54) CHARGER MODULE FOR AN INTERNAL COMBUSTION ENGINE

(75) Inventors: Ralf Doring, Gerolfing (DE); Joerg Riegner, Strahwald (DE); Jens-Uwe Kaulbach, Lenting (DE); Ralph Hollmig, Ingolstadt (DE)

(73) Assignee: Audi AG, Ingolstadt (DE)

( * ) Notice: Subject to any disclaimer, the term of this patent is extended or adjusted under 35 U.S.C. 154(b) by 490 days.

(21) Appl. No.: 11/918,737

(22) PCT Filed: Apr. 12, 2006

(86) PCT No.: PCT/EP2006/003341
§ 371 (c)(1),
(2), (4) Date: Oct. 18, 2007

(87) PCT Pub. No.: WO2006/111307
PCT Pub. Date: Oct. 26, 2006

(65) Prior Publication Data
US 2009/0071450 A1    Mar. 19, 2009

(30) Foreign Application Priority Data
Apr. 19, 2005    (DE) .......................... 10 2005 017 970

(51) Int. Cl.
*F02B 33/00*        (2006.01)
*F02B 29/04*        (2006.01)

(52) U.S. Cl.
USPC ....................................... 123/559.1; 123/563

(58) Field of Classification Search ............... 123/559.1, 123/563; *F02B 29/04*
See application file for complete search history.

(56) References Cited

U.S. PATENT DOCUMENTS

| | | | | |
|---|---|---|---|---|
| 2,505,197 A * | 4/1950 | McCulloch et al. | .......... | 418/179 |
| 2,519,588 A * | 8/1950 | McCulloch | .................... | 418/179 |
| 2,804,284 A * | 8/1957 | Otten | ............................. | 165/166 |
| 2,985,157 A * | 5/1961 | Venediger | ................ | 123/65 BA |
| 5,332,376 A * | 7/1994 | Lindbrandt | .................... | 418/179 |
| 6,029,637 A | 2/2000 | Prior | ........................... | 123/559.1 |
| 6,079,394 A * | 6/2000 | Abthoff et al. | ............. | 123/559.1 |
| 6,837,195 B2 * | 1/2005 | Suwazono | ................ | 123/559.1 |
| 6,874,486 B2 * | 4/2005 | Prior et al. | ................. | 123/559.1 |
| 7,011,079 B2 * | 3/2006 | Park | ........................... | 123/559.1 |
| 7,089,737 B2 * | 8/2006 | Claus | ......................... | 123/559.1 |
| 7,426,921 B2 * | 9/2008 | Billings et al. | ............. | 123/559.1 |
| 7,597,088 B2 * | 10/2009 | Tally | ........................... | 123/559.1 |
| 7,604,467 B2 * | 10/2009 | Prior | ........................... | 123/559.1 |
| 8,181,728 B2 * | 5/2012 | Hartland et al. | ............. | 180/68.3 |

(Continued)

FOREIGN PATENT DOCUMENTS

| | | |
|---|---|---|
| DE | 103 36 194 A1 | 3/2005 |
| DE | 102004049027 | * 4/2006 |

(Continued)

*Primary Examiner* — Thai Ba Trieu
(74) *Attorney, Agent, or Firm* — Novak Druce Connolly Bove + Quigg LLP

(57) ABSTRACT

The invention relates to a charger module (1) for an internal combustion engine, comprising a mechanical charger (2) and two charge coolers (3, 4), mounted downstream of the charger (2), for cooling the compressed charge air. The aim of the invention is to reduce the costs for producing such a charger module without impairing the rigidity or structural stability of the charger module (1). For this purpose, the charger (2) and the two charge coolers (3, 4) are inserted in a common housing (5) which surrounds the charger (2) and the two charge coolers (3, 4) at least on the bottom side and on two opposite sides.

1 Claim, 3 Drawing Sheets

| U.S. PATENT DOCUMENTS | | | | |
|---|---|---|---|---|
| 2004/0194766 A1* | 10/2004 | Prior et al. | | 123/559.1 |
| 2008/0060622 A1* | 3/2008 | Prior | | 123/559.1 |
| 2009/0288648 A1* | 11/2009 | Prior et al. | | 123/559.1 |
| 2010/0018509 A1* | 1/2010 | Prior et al. | | 123/559.1 |
| 2010/0116254 A1* | 5/2010 | Kaplan et al. | | 123/559.1 |

| FOREIGN PATENT DOCUMENTS | | | |
|---|---|---|---|
| EP | 1144821 | B1 | 12/1999 |
| EP | 1 433 936 | A1 | 6/2004 |
| EP | 1170478 | B1 | 12/2004 |

* cited by examiner

CHARGER MODULE FOR AN INTERNAL COMBUSTION ENGINE

CROSS-REFERENCE TO RELATED APPLICATIONS

This application claims priority from German Application No. 102005017970.3 filed Apr. 19, 2005, hereby incorporated by reference in its entirety.

The invention relates to a charger module as well as an internal combustion engine.

BACKGROUND OF THE INVENTION

In the applicant's German Patent Application DE 102004049027.9 a charger module of the above-mentioned type is already described for a V-type internal combustion engine in which the two charge air coolers that are arranged on the left and the right of the charger are braced on two anchoring plates that project laterally over a housing of the charger in order to rigidify the module and thus reduce damage caused by operationally-induced vibration. The charge air coolers are held there by a cover that is designed as an air distributor, and said cover is screwed together with the anchoring plates through the housing of the charge air cooler.

To impart stability that is sufficient for clamping between the anchoring plate and the air distributor cover to the charge air coolers, and to ensure an airtight connection to the anchoring plate or to the air distributor cover on the top and bottom thereof, the charge air coolers must have a-stable cast housing with a flat sealing flange on the top and bottom, which produces significant additional costs in production in comparison to a charge air cooler that is produced in a light sheet-metal design.

Based on this, the object of the present invention is to reduce the production costs in a charger module of the above-mentioned type without impairing the rigidity or the structural strength of the charger module.

SUMMARY OF THE INVENTION

This object is achieved according to the invention in that the charger and the two charge air coolers are used in a common housing, which surrounds the charger and the two charge air coolers at least on the bottom and on two opposite sides. By using a stable, common housing for the charger and the two charge air coolers, the two charge air coolers in light design can be produced from sheet metal and can be used in the housing, by which not only can the production costs of the entire charger module be reduced, but also the heat transfer from the charge air to the cooling water can be improved. Moreover, the common housing imparts to the charger module a comparatively high stability and rigidity, by which a vibration-free fastening to the internal combustion engine is made possible and thus the acoustics are improved by reducing vibration-induced noise generation.

Since the housing must have a relatively complicated shape with a series of openings in various sides because of the number of components housed within, it is preferably produced by a sand-casting process from light metal.

According to a preferred embodiment of the invention, the charger module is used in V-type internal combustion engines, which have an engine block, two rows of V-shaped cylinders arranged in the engine block, and two cylinder heads that are fastened above the rows of cylinders over the engine block, the charger module bridging an intermediate space between the cylinder heads of the two rows of cylinders. This arrangement ensures the connection of the charger module to the two cylinder heads and thus enables double fastening of the charger module to the engine block for an especially vibration-free design.

Advantageously, the charger in the charger module is arranged in the center between the two charge air coolers, the charge air that is compressed by the charger flowing to an air distributor, which is arranged on the top of the charger module between the charger and the charge air coolers and which preferably is integrated also in the housing of the charger module, to the two charge air coolers and from there downward through the respective cylinder head into the cylinder; whereby, the response behavior can be considerably improved by the extremely short air passages between the charger and the cylinder heads.

Especially high stability of the fastening and especially short air passages are thus achieved in that the housing of the charger module below the two charge air coolers is supported directly with its bottom on the two cylinder heads and is tightly screwed on the latter or on hinged flanges onto the cylinder heads, with a large number of air outlets on the bottom of the housing emptying directly into corresponding air channels in the cylinder heads or hinged flanges that lead to the cylinders.

The arrangement of the charger in the center between the two charge air coolers also facilitates the driving of the charger by means of the crankshaft of the internal combustion engine, which preferably is connected via a belt drive to a drive shaft of the charger that projects over a face of the housing.

In addition to providing an enclosure for the charger and the two charge air coolers, the housing may advantageously also comprise a bypass for partial-load adjustment, wherein a portion of the air suctioned off from the charger can be returned to an air intake of the charger and sent to the circuit by the charger. The bypass is preferably arranged above the charger on the top of the housing, as a result of which the air passage through the bypass can also be kept short.

To mount the charger and the two charge air coolers in the housing, the latter is preferably equipped with openings through which the charger and the two charge air coolers can be introduced or inserted into the housing. The opening for inserting the charger is advantageously arranged on one of the two faces of the housing, preferably on the face that is opposite to a charge air intake opening of the charger.

According to a first alternative, however, the two charge air coolers can be inserted into the housing from above, and in this case, said housing is advantageously equipped with at least one opening on its top. After the insertion of the respective charge air cooler, the opening is sealed, while according to a preferred embodiment of the invention, a single screw cap is provided that extends over the entire width of the housing and forms the air distributor, which distributes the air that is compressed in the charger to the two charge air coolers.

According to a second preferred alternative, the two charge air coolers are each inserted into the housing through a front opening. This alternative makes a fastening of cooling water connections to the housing of the charger module unnecessary, since the cooling water connections can be applied on the front end itself of the charge air cooler that is adjacent to the insertion opening, so that they lie outside of the housing, since the charge air cooler has been inserted completely into the insertion opening. In this latter case, the housing is sealed on its top preferably by a cover that is designed with a bottom and side walls of the housing as a unit and said cover is formed together with the remainder of the housing during pouring of the casting and is advantageously also designed inside as an air distributor.

BRIEF DESCRIPTION OF THE DRAWINGS

Below, the invention will be explained in greater detail based on two embodiments that are depicted in the drawing. Here.

DETAILED DESCRIPTION OF EMBODIMENTS OF THE INVENTION

Figure 2:
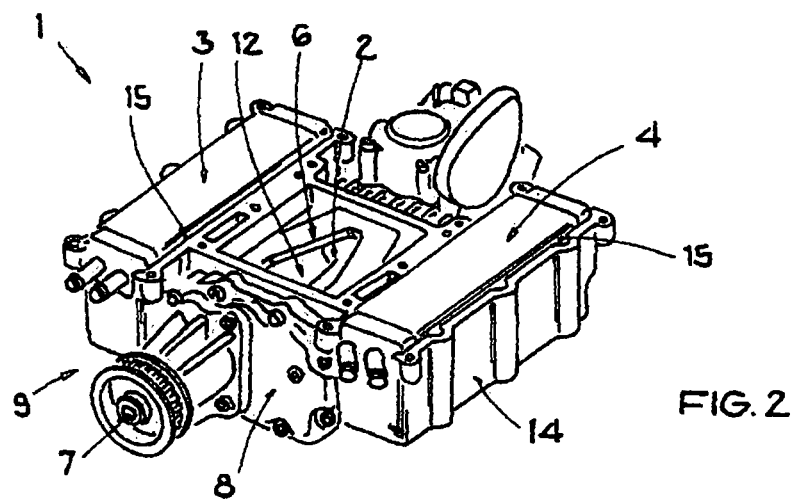
FIG. 2: shows a view as shown in FIG. 1, but with a removed air distributor cover.

As can best be seen from FIG. 2, the charger module 1, shown in the drawing, for an internal combustion engine that is designed as a 6-cylinder V-engine (not shown) essentially consists of a mechanical charger 2 and two charge air coolers 3, 4, arranged on both sides of the charger 2, and said coolers are installed in a common housing 5.

The mechanical charger 2 is a compressor that operates according to the displacement principle with or without inner compression, which can be designed either as a Roots compressor or as a screw compressor of the Lysholm type.

The charger 2 comprises two rotary pistons or rotors (not shown) with parallel axes of rotation, which are arranged beside one another in a cavity 6 that is surrounded by the housing 5.

Figure 5:
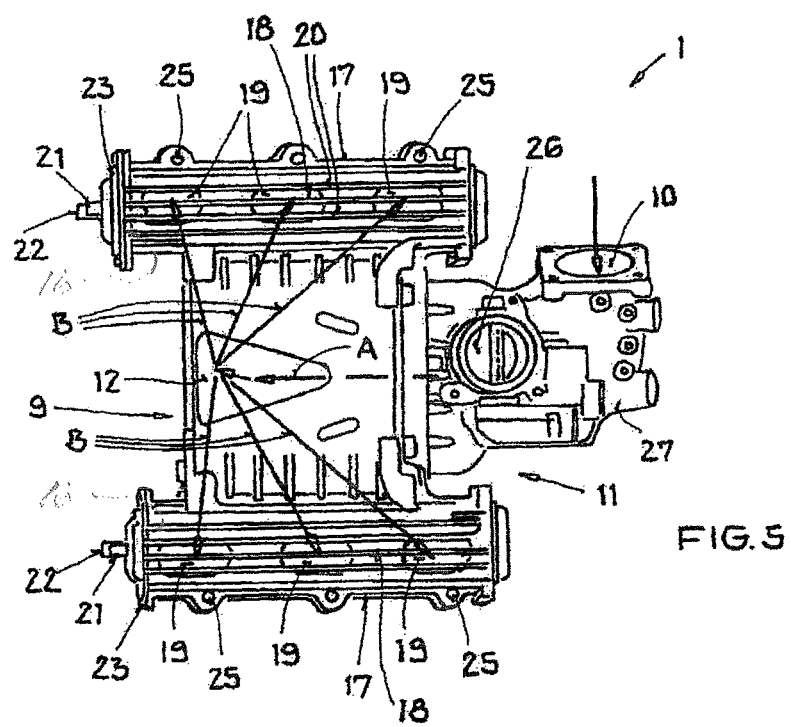
FIG. 5: shows a top view of the charger module shown in FIG. 4, but with a partially cut-away air distributor cover.

The rotary pistons or rotors are connected via a synchromesh gear (not shown) to a compressor-drive shaft 7 that projects through a sealing cover 8 on a front end face 9 of the housing 5 and is driven by means of a drive belt (not shown) from the crankshaft of the internal combustion engine. The drive of the charger 2 causes charge air to be aspirated through an air intake opening 10, connected via a throttle to an air filter and an intake manifold (not shown) of the internal combustion engine, into the charger 2 on the rear end face 11 of the housing 5; from the charger, it is ejected again after passing between the rotary pistons or rotors and a boundary wall of the cavity 6 through an air outlet opening 12 that is arranged on its top lies along a centerline of the boundary wall and is provided with side edges, each disposed laterally of and at an acute angle to such centerline, as is best shown in FIG. 5. An air distributor cover 13, which divides air stream A, exiting from the air outlet opening 12, into partial streams B and then, within the housing 5, directs said partial streams uniformly to both sides to the charge air coolers 3, 4, is located above the air outlet opening 12.

Figure 1:
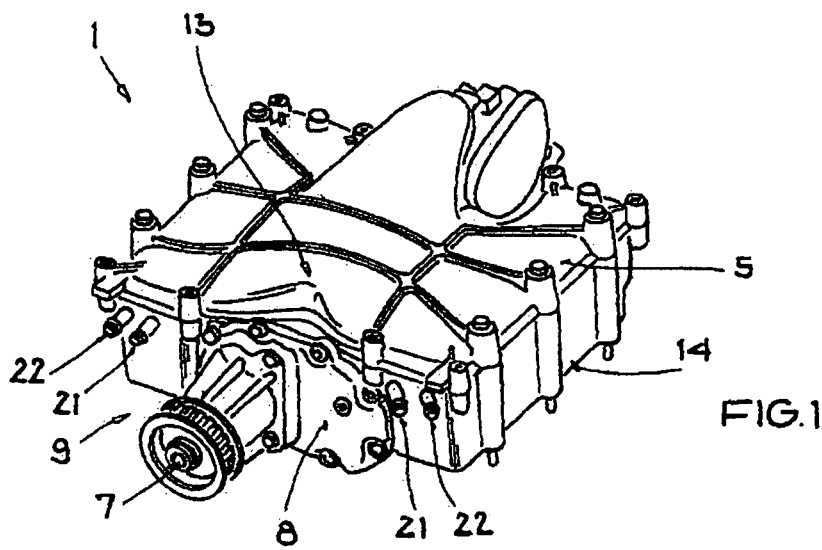
FIG. 1: shows a perspective top view of a charger module for a V-type internal combustion engine with a mechanical charger, two charge air coolers and a screwed-in air distributor cover.
Figure 3:
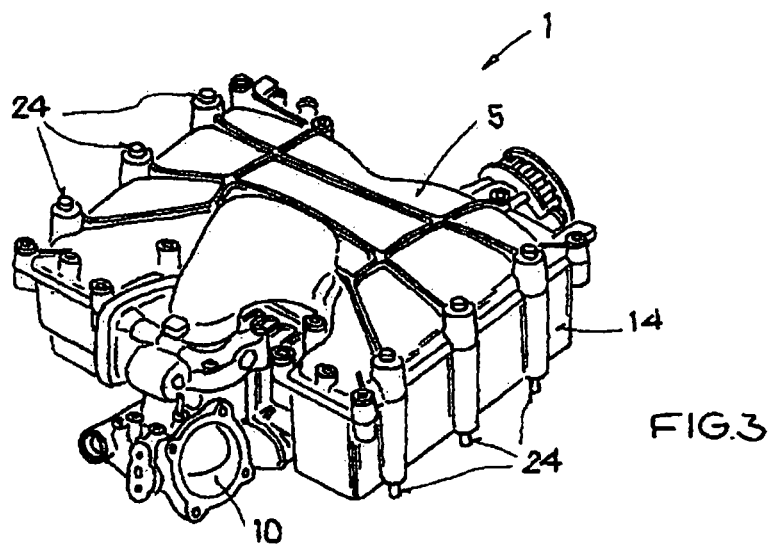
FIG. 3: shows a perspective top view of the charger module from another line of sight.

In the charger module 2 that is shown in FIGS. 1 to 3, the housing 5 is designed in two parts, it essentially consisting of a base part 14 that accommodates the charger 2 and the two charge air coolers 3, 4 and a screw cap that forms the air distributor 13, both of which are produced from aluminum in the sand-casting process.

On its front face 9, the base part 14 of the housing 5 has an insertion opening for inserting the charger 2, which is closed after the sealing cover 8 is inserted. The base part 14 further has two recesses 15, open at the top, in which the two charge air coolers 3, 4 are inserted from above into the base part of the housing 14, before the air distributor cover 13 is screwed on, which then extends over the entire top of the housing 5 and closes the insertion openings on the tops of the recesses 15.

Figure 4:
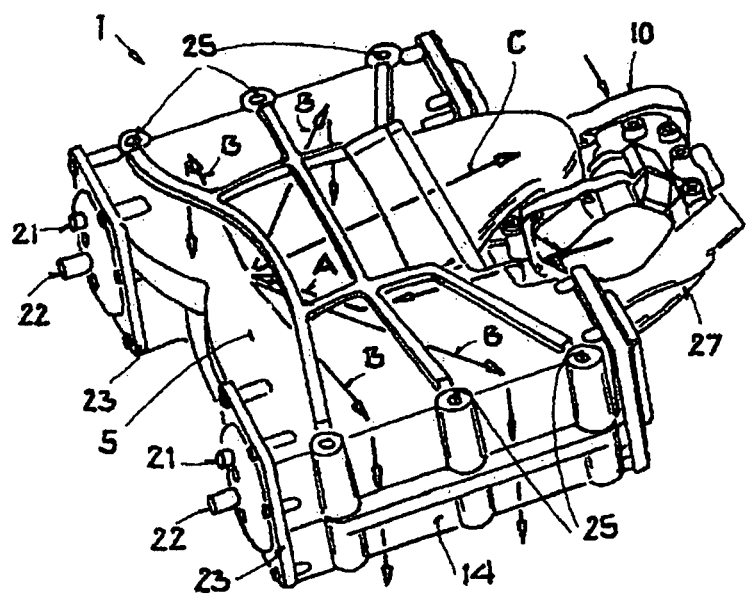
FIG. 4: shows a perspective top view of a modified charger module with an air distributor jacket that is designed as an integral part of the housing, but without the charger.

In the charger module 2 that is shown in FIGS. 4 and 5, the housing 5 that is also produced by a sand-casting process from aluminum, however, is designed in one piece with air distributor cover 13 and is equipped on its front face 29 with two insertion opening 16, by which the charge air coolers 3, 4 can be inserted from the front into the housing building 5.

As is best shown in FIG. 5, the two charge air coolers 3, 4 that are made of aluminum in a light design in each case have a cooler housing 17 that is matched to the shape of the recesses 15 or insertion openings 16, said cooler housing being open on its top and bottom and enclosing a somewhat rectangular vertical air channel 18 in cross-section. The air channel 18 extends from an upper air intake that communicates with the air outlet opening 12 of the charger 2 through the air distributor 13 up to an air outlet that is arranged on the bottom of the cooler housing 17, where the cooled charge air moves directly into air channels in the cylinder head that extend onward through a number of air outlet openings 19 in the bottom of the housing 5 that corresponds to the number of cylinders of the internal combustion engine. The cooler housings 17 in each case contain a large number of parallel cooling fins 20, which are arranged in longitudinal direction of the charge air coolers 3, 4, i.e., parallel to the compressor shaft of the charger 2, between opposite front boundary walls of the air channel 18, and cooling water flows through them. The latter is fed into the cooling fins 20 by a cooling water intake 21 that is arranged in the front face of the housing 5 and exits again from the coolers 3, 4 through a cooling water outlet 22 that is arranged next to it or below it.

While the cooling water intake 21 and the cooling water outlet 22 are integrated into the charger module 1 in FIGS. 1 to 3 in the housing 5, they form a part of a sealing cover 23, sealing the insertion opening 16 and screwed on with the housing 5, on the front ends of the charge air coolers 3, 4 in the charger module 1 in FIGS. 4 and 5.

After assembly, the charger module 1 is mounted on the two cylinder heads of the internal combustion engine, the bottom of the housing 5 lying below the charge air coolers 3, 4 against the tops of two hinged flanges (CVTS flanges) that sit on the cylinder heads of the internal combustion engine, and the air outlet openings 19 being aligned with corresponding air inlet openings in the hinged flanges. Fastening of the charger module is done with the aid of fastening screws 24, which are screwed into threaded holes of the hinged flanges by through-holes 25 in the housing 5.

As best shown in FIG. 4 with an arrow C in dashes, the housing 5 also encloses a bypass for partial-load adjustment that is arranged below the air distributor cover 13, said bypass extending between the charger 2 and the air distributor cover 13 up to the rear face 11 of the housing 5, where it can be connected, if necessary, with the aid of a pivotable bypass flange 26 (FIG. 5), to an add-on part 27 that is flanged on the housing 5, with an air intake channel between the air inlet opening 11 and the charger 2, to move a portion of the charge air in the circuit through the charger 2.

REFERENCE SYMBOL LIST

1. Charger module
2. Charger

3. Charge air cooler
4. Charge air cooler
5. Housing
6. Cavity
7. Drive shaft
8. Sealing cover
9. Face of the housing
10. Air intake opening
11. Face of the housing
12. Air outlet opening
13. Air distributor cover
14. Housing base part
15. Recesses
16. Insertion openings
17. Cooler housing
18. Air channel
19. Air outlet openings
20. Cooling fins
21. Cooling water intake
22. Cooling water outlet
23. Sealing cover
24. Fastening Screws
25. Through-holes
26. Bypass flap
27. Add-on part
A, B, C Arrows showing air flow

The invention claimed is:

1. A charger module for an internal combustion engine, comprising:
   a mechanical charger,
   two charge air coolers,
      wherein the two charge air coolers are positioned downstream from the mechanical charger for cooling compressed charge air; and
      wherein the mechanical charger is arranged along a centerline of the charger module between the two charge air coolers;
   an air distributor,
      wherein the air distributor is arranged between the mechanical charger and the charge air coolers;
   a bypass for partial-load adjustment,
      wherein the bypass is arranged above the mechanical charger;
   a one-piece, sand-cast, aluminum housing,
      wherein the one-piece, sand-cast, aluminum housing surrounds the mechanical charger, the two charge air coolers, the air distributor, and the bypass on at least a bottom side of the charger module and on two opposite sides of the charge module; and
      wherein the one-piece, sand-cast, aluminum housing further comprises:
         a first face having an opening for inserting the mechanical charger and the two charge air coolers,
         a second face, opposite to the first face, having an air intake opening,
         a bottom face comprising a plurality of air outlet openings,
            wherein the plurality of said air outlet openings, are arranged below the two charge air coolers,
         a vertical air channel for circulating air from the air intake to the mechanical charger through the air distributor and to the plurality of said air outlet openings,
         a plurality of parallel cooling fins arranged in a longitudinal direction of the two charge air coolers, parallel to a compressor shaft of the mechanical charger, and between opposite front boundary walls of the vertical air channel, and
         a plurality of connections for supply and removal of cooling water to the plurality of said parallel cooling fins,
            wherein air flowing through the vertical air channel flows in a cross-current direction with respect to cooling water flowing through the plurality of said parallel cooling fins.

\* \* \* \* \*